United States Patent [19]

Drioli et al.

[11] Patent Number: 5,028,329
[45] Date of Patent: Jul. 2, 1991

[54] PROCESS FOR PREPARING REVERSE-OSMOSIS MEMBRANE, AND MEMBRANE OBTAINED WITH THE PROCESS

[75] Inventors: Enrico Drioli, Napoli; Soccorso Gaeta, Occhieppo Inferiore; Marco Sogliano, Biella, all of Italy

[73] Assignee: Separem s.p.a, Biella, Italy

[21] Appl. No.: 425,352

[22] Filed: Oct. 20, 1989

Related U.S. Application Data

[63] Continuation of Ser. No. 308,628, Feb. 10, 1989, abandoned.

[51] Int. Cl.$^5$ .............................................. B01D 67/00
[52] U.S. Cl. ................................ 210/490; 210/500.38; 264/41
[58] Field of Search ........................... 210/490, 500.38; 264/209.1, 203, 216, 41

[56] References Cited

U.S. PATENT DOCUMENTS 3,951,815  4/1976  Wrasidlo .................... 210/500.24 X
4,123,424 10/1978  Credali et al. ................. 264/203 X
4,230,583 10/1980  Chiolle et al. ..................... 210/490

Primary Examiner—Frank Spear
Attorney, Agent, or Firm—Stevens, Davis, Miller & Mosher

[57] ABSTRACT

The present invention relates to a process for preparing polypiperazinamide-based reverse-osmosis membranes comprising:

(a) preparing a solution of polypiperazinamide in a polar organic solvent;
(b) applying the solution on a planar support so as to form a planar body;
(c) evaporating the solvent under the action of a flow of air, said air flow having, with respect to said planar support, such a speed as to produce Reynolds numbers between 5 and 100;
(d) gelling the planar body by phase reversal by passing through a coagulation bath to form the membrane; and
(e) washing the membrane to extract the solvent contained therein. The entire process is carried out at a temperature lower than about 30° C.

The invention allows the production of reverse-osmosis membranes with high flow and high mechanical characteristics.

21 Claims, 7 Drawing Sheets

PROCESS FOR PREPARING REVERSE-OSMOSIS MEMBRANE, AND MEMBRANE OBTAINED WITH THE PROCESS

This application is a continuation of application Ser. No. 308,628, filed Feb. 10, 1989, now abandoned.

BACKGROUND OF THE INVENTION

1. Field of the Invention

The present invention relates to a process for preparing reverse-osmosis membranes and to the membranes produced by said process. In particular, the field of the present invention relates to a process which is particularly suitable for forming planar membranes which are asymmetrical with respect to the plane which cuts the membrane halfway across its thickness. The field of the present invention further relates to polypiperazinamide-based membranes, which are defined as all polycondensation products of piperazine or of piperazine with alkyl substitutions in the nucleus, possibly in mixture with other diamines, with anhydrides or dichlorides of saturated or unsaturated, aromatic or heterocyclic aliphatic di-carboxylic acids, such as fumaric acid, mesaconic acid, adipic acid, phthalic acid, isophthalic acid, phthalic acids with substituted aromatic nucleus or heterocyclic acids derived from furan, thio-furan, pyridine, thiophene and the like, either alone or in mixture with one another. Polypiperazinamides belonging to the field of the present invention are described in the Italian patent application No. 22179 A/82 filed by Montedison S.p.A. which related to the production of ultrafiltration and reverse-osmosis membranes.

In particular, Italian patent application No. 22179 A/82 discloses a procedure for manufacturing asymmetrical planar supported membranes based on polypiperazinamides, wherein the polypiperazinamide is dissolved in a polar organic solvent, the obtained solution is applied on a planar or tubular support, the body thus formed being then gelled by being passed through a coagulation bath.

The above is summarily the main field of industrial use of the invention; said field however does not limit the scope of the present invention, since the process according to the invention, in particular as described and claimed hereinafter, can be advantageously used in any other equivalent field in which reverse-osmosis membranes are prepared by means of a solubilization step and a phase-reversal step.

2. Prior Art

In practice, however, it has been observed that the process illustrated in the Italian patent application No. 22179 A/82 is not free from disadvantages. In particular planar membranes thus obtained have scarce mechanical resistance, which prevents or at least severely complicates the formation of coiled-spiral modules, so that the membranes can be used only in the planar or tubular form in which they were originally formed. This constitutes a limitation in practical use, since the formation of coiled-spiral modules is in itself particularly useful and practical for the final use of the membranes.

The aim of the present invention is therefore to eliminate the above described disadvantages by providing a polypiperazinamide-based asymmetrical planar membrane having considerable mechanical resistance such as to allow the working of said planar membrane by folding to form coiled-spiral membrane modules, without the overall properties of the membrane suffering from any appreciable degradation.

An object of the invention is to form the membrane on a non-woven-fabric support in a planar configuration which can subsequently be folded to form coiled-spiral modules.

SUMMARY OF THE INVENTION

This aim, this object and others are achieved by the present invention, which is characterized in that it comprises the following succession of steps:

(a) preparing a solution of polypiperazinamide in a polar organic solvent;

(b) applying said solution on a planar support so as to form a planar body;

(c) evaporating the solvent under the action of a flow of air;

(d) gelling said planar body by phase reversal by passing through a coagulation bath to form the membrane; a (e) washing the membrane to extract the solvent contained therein.

The above described aim and objects are further achieved by a polypiperazinamide-based membrane adapted to produce a coiled-spiral membrane module according to the invention, characterized in that the thickness of said membrane is smaller than 100 microns and preferably greater than 50.

The polypiperazinamide solutions are prepared, for example, in appropriately constructed and preset thermoagitators so that the temperature of the solution does not exceed 35° C. and is not lower than 10° C. The step of preparing the solution sequentially comprises the loading of the solvent, the addition of approximately 50% of the polymer, the beginning of the agitation, and the successive gradual addition of the remaining polymer. The agitation time is preferably shorter than 10 hours.

The solution is filtered with a filtering gauze having a mesh of less than 5 microns and preferably of 2–3 microns and under a head of nitrogen. The filtering solution is allowed to degas until the gases it contains are eliminated. The filtration and degassing of the solution are fundamentally important for subsequently preparing membranes which are uniform, mechanically resistant and stable over time.

The characteristics of the polymer must be such as to ensure an intrinsic viscosity at 20° C. of between 2.0 and 2.9 dl/g in tetrachloroethane or between 1.6 and 2.0 dl/g in formic acid. The characteristics of intrinsic viscosity, and therefore of relative molecular mass, of the polymer are extremely important in preparing membranes which are mechanically resistant and adapted to produce coiled-spiral modules. The humidity content of the polymer is lower than 0.5%. This fact the phase reversal kinetics and is extremely important for preparing high-flow membranes. The solutions are preferably prepared using a polar organic solvent chosen from Class S of the classification of H. Burrel. Said solvent is preferably formic acid. The concentration of the polymer in the polymeric solution thus obtained is preferably between 16% and 19% by weight. The degassed solution is continuously applied in industrial quantities on a support of non-woven fabric in polyester or polypropylene with a thickness between 50 and 300 microns. The thickness of the film of solution applied on the support varies between 50 and 100 microns according to the characteristics of the required membranes. The membrane being formed travels for a certain distance in a controlled environment where the solvent partially evaporates. The evaporation time is between 60 and 250 seconds; the application speed of the membrane varies between 0.3 m/min and 2 m/min; the temperature of the support is between 15° and 28° C.; and the relative humidity of the evaporation region is preferably higher than 80%. The temperature of the air of the evaporation region is preferably between 15° and 28° C. The flow of the air overlying the planar support of the membrane must be such as to produce speeds resulting in Reynolds numbers between 5 and 100 and preferably between 10 and 20. The Reynolds numbers are expressed by $Re = cvd/u$, where v is the relative speed of the air with respect to the planar body of the membrane being formed, c is the density, d is the equivalent diameter and n is the viscosity. After passing through the evaporation region, the membrane being formed is immersed in a coagulation bath, where the phase reversal is completed. The bath contains demineralized water with a conductivity between 5 and 20 microsiemens/cm at 20° C. The temperature of the coagulation bath is lower than 15° C., preferably lower than 5° C. and more preferably lower than 3° C. The angle of immersion of the film being formed in the coagulation bath must be between 80° and 90°. The immersion time is between 15 minutes and 25 minutes. The pH of the bath is between 2 and 4. The obtainment of mechanically resistant asymmetrical supported membranes with intermediate rejection according to the invention, so as to be usable for preparing coiled spiral modules, is controlled by the above described parameters and by the indicated values of the respective ranges of variability.

Another operation which is decisive in obtaining membranes usable in coiled spiral modules is the washing of the membrane immediately after it has been formed. The membrane must be washed with mains water or with basic solutions at a temperature higher than 15° C. but lower than 50° C. and preferably lower than 30° C. continuously until the bath in which the manufactured membrane is immersed reaches a neutral pH. The membranes thus manufactured need no thermal treatment, their flow is between 30 and 60 lt/h.sq.m and their saline rejection is between 30% and 95% (at 25° C., 2000 ppm of NaCl, 30 Atm); their mechanical resistance is such as to be usable to prepare coiled-spiral modules; the chemical resistance to contact with acids (up to pH=1.5) and bases (up to pH=12) is excellent; and the resistance to oxidating agents and in particular to chloride (up to a concentration of 50 ppm) is optimum.

The obtained membrane has a thickness of less than 100 microns and preferably of more than 50 microns. The membrane has a dense surface layer and a spongy underlying layer, as illustrated in the accompanying photographs.

DETAILED DESCRIPTION OF THE PREFERRED EMBODIMENTS

EXAMPLE 1

Figure 1A:
FIGS. 1a, 1b, 2a, 2b, and 2c are microphotographs of the cross section of the membranes produced in Example 1.
Figure 1B:
Figure 2A:
Figure 2B:
Figure 2C:
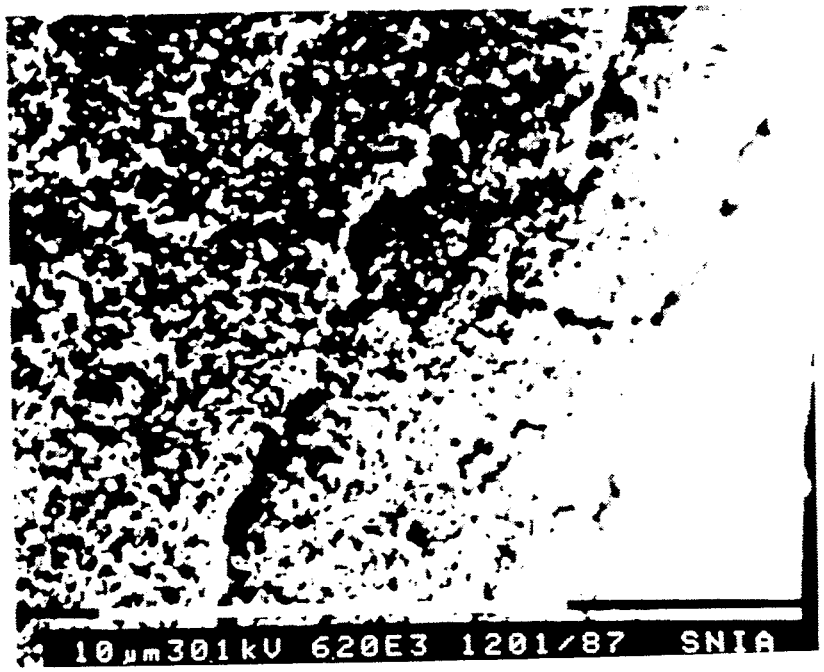
Figure 3A:
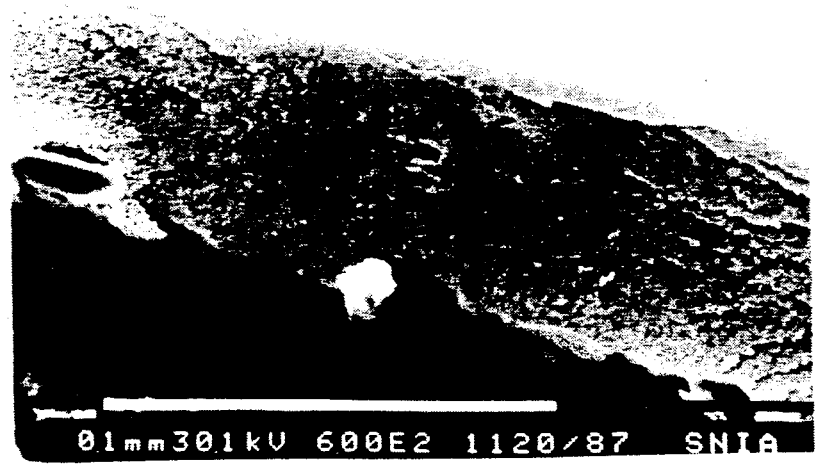
FIGS. 3a, 3b, 4a, 4b, and 4c are microphotographs of the cross section of the membranes produced in Example 2.
Figure 3B:
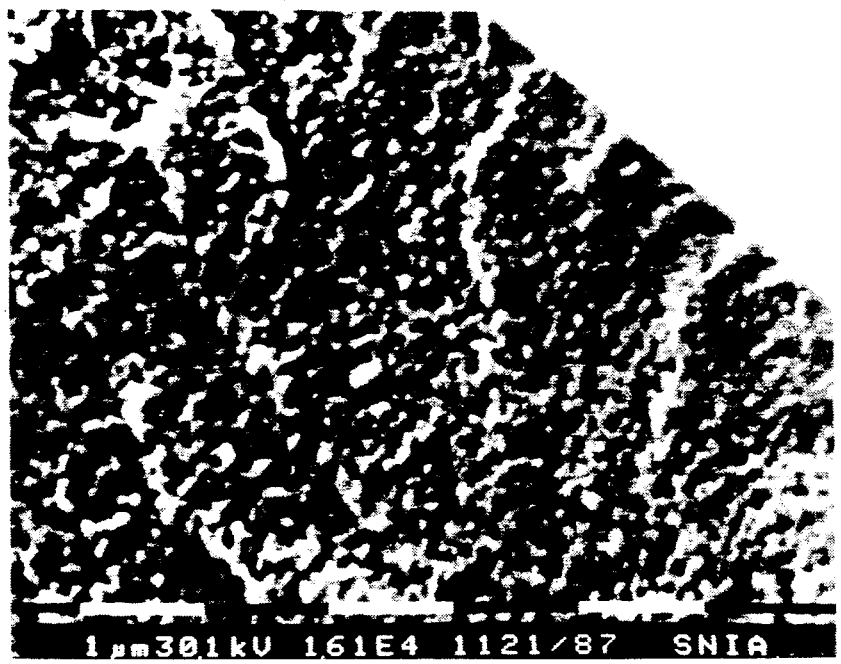
Figure 4A:
Figure 4B:
Figure 4C:

Preparation of a reverse-osmosis membrane and related spiral module with saline rejection equal to 95%.

A 100-g polymeric solution is prepared with 82 g of formic acid (titer 99/100%) and 18 g of polymer Poly-Trans 2.5, dimethylpiperazinethiofurazanamide, characterized by an intrinsic viscosity in tetrachloroethane higher than 2.3 dl/g. The solution is agitated for 10 hours at 20° C. and then filtered with an AISI 316 2-micron steel mesh and degassed under a vacuum. The solution is applied on a support of non-woven polyester fabric and a speed of 0.3 m/min, at a temperature of 20° C., with a relative humidity of 80% in the solvent evaporation region, and such an air speed as to define fluidodynamic conditions characterized by a Reynolds number of 15. The thickness of the polymeric film is 100 microns. The coagulation bath is water, characterized by a conductivity of 20 microsiemens/cm at 20° C. and by a pH of 3. The temperature of the bath is 0.5° C. and the time of permanence in the bath is 18 minutes. The formed membrane is washed for 5 minutes in water at 15° C. and stored for 24 hours in demineralized water.

Five samples of the planar membrane are characterized with a planar-cell system fed by an aqueous solution of NaCl at 2000 ppm, 25° C. and 30 atm and with a flow-rate of 400 lt/h. The results are listed in Table 1.

Table 1. Flow and saline rejection values of the planar membranes of Example 1.

TABLE 1

| membrane | flow (lt/h/sq.m) | saline rejection (%) | test time (hours) |
| --- | --- | --- | --- |
| ST74E11 | 50 | 95 | 20 |
| ST74E12 | 39 | 95 | 20 |

A type 495T spiral module was coiled using the manufactured membrane and yielded the following values during characterization: flow 45 lt/h/sq.m, saline rejection 95%. Characterization was performed with an aqueous solution of NaCl at 2000 ppm, 25° C., 30 atm, an axial flow rate of 2000 it/h and a pH of 6.7.

Microphotographs of the cross section of the membranes obtained are illustrated in FIGS. 1a, 1b, 2a, 2b and 2c.

EXAMPLE 2

Preparation of a reverse-osmosis membrane and of a related spiral module with 85% saline rejection.

A 100-g polymeric solution is prepared with 82 g of formic acid (titer 99/100%) and 18 g of polymer as in Example 1, except that the solution is applied with an application speed of 0.7 m/minute and an air speed corresponding to a Reynolds number of 13. The produced planar membrane is characterized as in Example 1 and the results are listed in Table 2.

Table 2. Flow and saline rejection values of the planar membranes of Example 2.

| membrane | flow (lt/h/sq.m) | saline rejection (%) | test time (hours) |
| --- | --- | --- | --- |
| ST74E6 | 42 | 85 | 20 |
| ST74E7 | 38 | 88 | 20 |

A type 470T spiral module was coiled with the produced membrane and yielded the following values during characterization in the conditions listed in Example 1: a flow of 40 lt/h/sq.m, and saline rejection of 85%.

Microphotographs of the cross section of the produced membranes are illustrated in FIGS. 3a, 3b, 4a, 4b and 4c.

EXAMPLE 3

Preparation of a reverse-osmosis membrane and of the related spiral module with a saline rejection of less than 55%.

The polymeric solution and the planar membrane are prepared as in Example 2 except that the application speed is equal to 1 m/minute and the Reynolds number is 20. The planar membrane is characterized as in Examples 1 and 2 and the results are listed in Table 3. Table 3. Flow and saline rejection value of the planar membranes of Example 3.

| membrane | flow (lt/h/sq.m) | saline rejection (%) | test time (hours) |
|---|---|---|---|
| SM 52 | 98 | 50 | 24 |
| SM 52 | 95 | 51 | 24 |
| SM 52 | 100 | 54 | 24 |
| SM 52 | 92 | 54 | 24 |
| SM 52 | 87 | 53 | 24 |
| SM 52 | 85 | 49.7 | 24 |

A type 400T spiral module was coiled using the produced membrane and yielded the following values during characterization at the conditions of Examples 1 and 2: a flow of =90 lt/sq.m, and saline rejection of 50%.

Figure 5A:
FIGS. 5a, 5b, and 5c are microphotographs of the cross section of the membranes produced in Example 3.
Figure 5B:
Figure 5C:
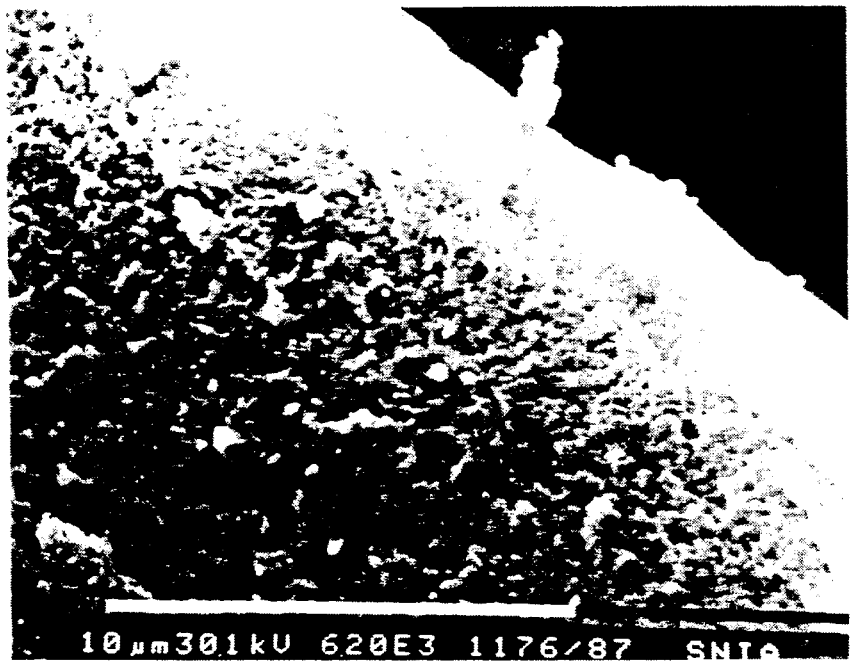

Microphotographs of the cross section of the produced membranes are illustrated in FIGS. 5a, 5b and 5c.

EXAMPLE 4

Preparation of a reverse-osmosis membrane and of the related spiral module: influence of evaporation temperature.

A polymeric solution and the planar membrane are prepared as in Example 1 except that the solvent evaporation temperature is 40° C. Then a comparison membrane is applied with an evaporation temperature of 15° C. The membrane is characterized as in Examples 1 and 2 and the results are listed in Table 4. Table 4. Flow and saline rejection values of the planar membranes of Example 4.

| membrane | flow (lt/h/sq.m) | saline rejection (%) | test time (hours) |
|---|---|---|---|
| SM 450A | 21.8 | 81.5 | 24 |
| SM 450B | 24.6 | 82.8 | 24 |
| T = 15° C. | | | |
| SM 448A | 33 | 94.1 | 24 |
| SM 448B | 32 | 93.8 | 24 |
| SM 448C | 29 | 93.6 | 24 |
| SM 448D | 32 | 96.7 | 24 |
| SM 448E | 35 | 95 | 24 |

Two type 400T spiral modules were coiled using the produced membrane and yielded the following results during characterization at the conditions of Example 1: with membrane at T=40° C.: flow=20 l/h/sq.m; rejection 82% with membrane at T=15° C.: flow=35 l/h/sq.m; rejection 95%

EXAMPLE 5

Influence of the filtration of the polymeric solution on the characteristics of the membrane and of the related modules.

The polymeric solution and the planar membrane are prepared as in Example 1 except that part of the solution is not filtered.

The membranes produced with filtered and non-filtered solutions are characterized as in Examples 1 and 2 and the results are listed in Table 5. Table 5. Flow and saline rejection values of the planar membranes of Example 5

| membrane | flow (lt/h/sq.m) | saline rejection (%) | test time (hours) |
|---|---|---|---|
| filtered solution | | | |
| SM 323A | 85 | 87 | 24 |
| SM 323B | 73 | 91.2 | 24 |
| SM 323C | 79 | 91.2 | 24 |
| SM 323D | 57 | 92.3 | 24 |
| SM 323E | 69 | 90.6 | 24 |
| SM 323F | 76 | 91 | 24 |
| non-filtered solution | | | |
| SM 325A | 214 | 43.4 | 24 |
| SM 325B | 142 | 49.4 | 24 |
| SM 325C | 167 | 54 | 24 |
| SM 325D | 209 | 47 | 24 |
| SM 325E | 167 | 50.3 | 24 |
| SM 325F | 146 | 56.2 | 24 |

Two type 400T spiral modules were coiled using the produced membrane and yielded the following results during characterization in the conditions of Example 1:

| non-filtered solution | Flow 174 l/h/sq.m | Rejection 50% |
|---|---|---|
| filtered solution | Flow 73 l/h/sq.m | |

EXAMPLE 6

Influence of the thickness of the planar membrane and of the viscosity of the polymer on the characteristics of the membranes and of the related modules.

The polymeric solution is prepared as in Example 1 except that the intrinsic viscosity of the polymer is equal to 1.33 dl/g. A planar membrane having a thickness of less than 50 microns and one having a thickness of 100 microns are prepared. The membranes obtained with the different two thicknesses are characterized as in Example 1 and 2 and the results are listed in Table 6. Table 6. Flow and saline rejection values of planar membranes of Example 6

| membrane | flow (lt/h/sq.m) | saline rejection (%) | test time (hours) |
|---|---|---|---|
| 50 microns thickness | | | |
| MS 11A 1 | 19 | 59 | 24 |
| MS 11B 1 | 12 | 64 | 24 |
| MS 11C 1 | 15 | 58 | 24 |
| MS 11D 1 | 18 | 56 | 24 |
| 100 microns thickness | | | |
| MS 11A 2 | 51 | 91.6 | 24 |

-continued

| membrane | flow (lt/h/sq.m) | saline rejection (%) | test time (hours) |
|---|---|---|---|
| MS 11B 2 | 49 | 92 | 24 |
| MS 11C 2 | 51 | 91.8 | 24 |
| MS 11D 2 | 56 | 90 | 24 |

Two type 400T spiral modules were coiled using the produced membrane and yielded the following results during characterization in the conditions of Examples 1 and 2 yielded the following results; as the membrane was furthermore produced with a polymer having viscosity = 1.33 dl/g, a comparison is made with a module produced with a membrane obtained in identical conditions but with polymer viscosity = 2.4 dl/g.

| Membrane | Viscosity | Flow l/h/sq.m | Rejection (%) |
|---|---|---|---|
| 50 microns | low | 26 | 49 |
| 100 microns | low | 60 | 81 |
| 100 microns | high | 36 | 94 |

We claim:

1. Process for preparing polypiperazinamide-based reverse-osmosis membranes comprising:
   (a) preparing a solution of polypiperazinamide in a polar organic solvent;
   (b) applying said solution on a planar support so as to form a planar body;
   (c) evaporating said solvent under the action of a flow of air, said air flow having, with respect to said planar support, such a speed as to produce Reynolds numbers between 5 and 100;
   (d) gelling said planar body by phase reversal by passing it through a coagulation bath to form the membrane; and
   (e) washing said membrane to extract said solvent contained within;
   wherein the entire process is carried out at a temperature lower than about 30° C.

2. Process according to claim 1, characterized in that said evaporation step is conducted for a time period of more than 60 seconds.

3. Process according to claim 2, wherein said evaporation step takes less than 250 seconds.

4. Process according to claim 1, characterized in that said air flow has a temperature between 15° and 28° C. and a relative humidity higher than 80%.

5. Process according to claim 1, characterized in that said coagulation bath is essentially formed by water at a temperature of less than 15° C.

6. Process according to claim 5, characterized in that said water has conductivity values between 5 and 20 microsiemens/cm at 20° C. and a pH between 2 and 4.

7. Process according to claim 5, wherein the temperature is lower than 5° C.

8. Process according to claim 7, wherein the temperature is lower than 3° C.

9. Process according to claim 1, characterized in that said polar organic solvent is chosen among solvents of Class S according to the classification of H. Burrel.

10. Process according to claim 9, characterized in that said polar organic solvent is formic acid.

11. Process according to claim 1, characterized in that the concentration of the polypiperazinamide in the polypiperazinamide solution is between 16% and 19% by weight, the solubilization temperature is between 18° and 25° C., and the solubilization time is not longer than 10 hours.

12. Process according to claim 1, characterized in that the preparation of the polypiperazinamide solution includes completely degassing and filtering the solution with steel gauze with a mesh of less than 5 microns.

13. Process according to claim 12, wherein the steel gauze has a mesh of 2-3 microns.

14. Process according to claim 1, characterized in that the thickness of the membrane is lower than 100 microns.

15. Process according to claim 1, characterized in that the planar support is a non-woven fabric, thus forming a supported asymmetrical membrane.

16. Process according to claim 1, characterized in that the casting speed of the membrane is between 0.3 and 2 m/min.

17. Process according to claim 1, characterized in that the newly formed membrane is continuously washed until the solvent is completely extracted from the polymeric film with water or basic solutions at a temperature between 15° and 50° C.

18. Process according to claim 17, wherein the temperature is between 15° and 30° C.

19. Process according to claim 1, characterized in that the polypiperazinamide has a humidity content of less than 0.5% by weight.

20. Process according to claim 1, wherein the Reynolds numbers are between 10 and 20.

21. A polypiperazinamide-based reverse-osmosis membrane produced by the process of claim 1.

* * * * *